United States Patent

Nishimura et al.

[11] Patent Number: 4,781,421
[45] Date of Patent: Nov. 1, 1988

[54] ACTUATOR FOR USE IN AN ANTI-SKID SYSTEM

[75] Inventors: Takumi Nishimura, Chiryu; Tadao Saito, Nagoya; Nobuyasu Nakanishi; Noboru Noguchi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 838,350

[22] Filed: Mar. 11, 1986

[30] Foreign Application Priority Data

Mar. 11, 1985 [JP] Japan ............................ 60-34872[U]

[51] Int. Cl.$^4$ ............................................. B60T 8/04
[52] U.S. Cl. ................................... 303/115; 303/113; 303/119
[58] Field of Search ................ 303/113, 115, 117, 119

[56] References Cited

U.S. PATENT DOCUMENTS

| | | | |
|---|---|---|---|
| 3,722,960 | 3/1973 | Von Lowis of Menar | 303/115 |
| 4,036,534 | 7/1977 | Kondo et al. | 303/115 |
| 4,526,426 | 7/1985 | Sato et al. | 303/115 |
| 4,636,010 | 1/1987 | Adachi et al. | 303/115 |

FOREIGN PATENT DOCUMENTS 2363619  7/1974  Fed. Rep. of Germany .
2519835 11/1976  Fed. Rep. of Germany .

Primary Examiner—Duane A. Reger
Assistant Examiner—Matthew C. Graham
Attorney, Agent, or Firm—Burns, Doane, Swecker & Mathis

[57] ABSTRACT

An actuator is disclosed for use in an anti-skid brake system for wheeled vehicles. A first valve is disposed in a pressure line to selectively divide the pressure line into two separate lines. Also included is an electric motor, a pump driven by the electric motor, an accumulator adapted to accumulate fluid pressure generated by the pump, a control piston reciprocating under the fluid pressure to open and close the first valve, a second valve adapted to supply the fluid pressure to the control piston upon normal rolling of wheels so as to move the control piston to a non-operative position while excluding the fluid pressure from the control piston when the wheels are likely to lock up, and a third valve having first and second valves and controlling the fluid pressure to be supplied to a hydraulic chamber in response to depression and release of a brake pedal. In this arrangement, a relief valve is provided in a seat member of the first valve so that when the fluid pressure exceeds a predetermined upper limit, it is opened to introduce hydraulic fluid to a drain line through the second valve.

4 Claims, 2 Drawing Sheets

ACTUATOR FOR USE IN AN ANTI-SKID SYSTEM

BACKGROUND OF THE INVENTION

1. Field of the Invention

The present invention relates to an actuator for use in an anti-skid system for wheeled vehicles.

2. Description of the Related Art

A conventional system of this type is disclosed in, for example, U.S. Pat. No. 3,722,960. As described therein, in such a system, high fluid pressure in an accumulator is supplied to a control piston when the wheels of a vehicle are normally rolling, and is excluded from the control piston only when the wheels are likely to lock up.

During operation, vehicles are under non-braked conditions for far less time than under braked conditions. It is for this reason that a large pressure load is applied to seal members arranged in the control piston to form a pressure line leading from the accumulator to the control piston. As a result, the seal members need be replaced after a short period of use due to deterioration and the maintenance of the system is cumbersome.

In a first approach to overcoming the foregoing problem, it was proposed to provide a changeover valve having a first valve arrangement for controllably communicating a hydraulic chamber supplying the fluid pressure to the control piston with the accumulator and stopping such communication and employing a second valve arrangement for controllably communicating the hydraulic chamber with a drain line and stopping such communication. Communication of the hydraulic chamber with the accumulator and the drain line respectively is effected in response to depression and release of a brake pedal. The second valve arrangement may also act as a relief valve to maintain the hydraulic chamber at a relatively low pressure level upon depression of the brake pedal.

It has also been proposed to use a regulator valve including first and second valve arrangements having the same purposes as discussed above and a piston operable under fluid pressure generated by a master cylinder to open and close the first and second valve arrangements. With this regulator valve, the fluid pressure is supplied from the accumulator to the hydraulic chamber in direct proportion to the fluid pressure generated by the master cylinder. The second valve arrangement may also act as a relief valve to maintain the hydraulic chamber at a relatively low pressure level upon depression of the brake pedal. Alternatively, the regulator valve may be provided with a spring for supplying a predetermined minimum pressure to the hydraulic chamber from the accumulator.

When a pump is driven by an electric motor, the accumulator could continuously be operated even after fluid pressure in the accumulator reaches a predetermined upper limit due to a failure in an electronic control circuit adapted to control the electric motor or a pressure-responsive switch adapted to detect the fluid pressure in the accumulator. This results in damage to the pressure line leading from the pump to a third valve and thus, leads to highly dangerous situations. To this end, it is necessary to provide a relief valve in the pressure line as a safety valve so as to prevent the fluid pressure from exceeding a predetermined upper limit. However, provision of such a relief valve may require a large and cumbersome system arrangement and assemblage.

SUMMARY OF THE INVENTION

It is, therefore, an object of the present invention to provide an actuator for use in an anti-skid system for wheeled vehicles, which is simple in construction and is easily assembled.

It is another object of the invention to provide an actuator for use in an anti-skid system, which prevents an increase in fluid pressure in a pressure line and damage thereto.

According to the present invention, an actuator for use in an anti-skid system, comprises a first valve disposed in a pressure line to selectively divide the pressure line into two lines, one directed to a master cylinder and the other directed to a wheel cylinder, the pressure line connecting the master cylinder with the wheel cylinder, an electric motor, a pump driven by the electric motor, an accumulator adapted to accumulate fluid pressure generated by the pump, a control piston movable from non-operative position under the influence of fluid pressure in the pressure line directed to the wheel cylinder and returnable to a non-operative position thereunder to open and close the first valve whereby the volume of the pressure line directed to the wheel cylinder is increased and decreased. A second valve is provided and adapted to supply the fluid pressure to the control piston upon normal rolling of wheels so as to move the control piston to the non-operative position against the fluid pressure in the pressure line directed to the wheel cylinder while excluding the fluid pressure from the control piston when the wheels are likely to lock up s that the control piston is moved from the non-operative position under the fluid pressure in the pressure line directed to the wheel cylinder. A third valve is also included which is provided with a valving arrangement for controllably communicating a hydraulic chamber with the accumulator and stopping such communication, the hydraulic chamber supplying the fluid pressure to the control piston, and an additional valving arrangement for controllably communicating the hydraulic chamber with a drain line and stopping such communication, the third valve controlling the fluid pressure to be supplied to the hydraulic chamber in response to depression and release of a brake pedal. In this arrangement, a relief valve is provided in a seat member of the valving arrangement of the third valve s that when the fluid pressure from the accumulator exceeds a predetermined upper limit, it is opened to introduce hydraulic fluid to the drain line through the additional valving arrangement.

BRIEF DESCRIPTION OF THE DRAWINGS

The above and other objects and advantages of the present invention will become more apparent from consideration of the following description when taken in conjunction with the accompanying drawings in which.

DESCRIPTION OF THE PREFERRED EMBODIMENT

Figure 1:
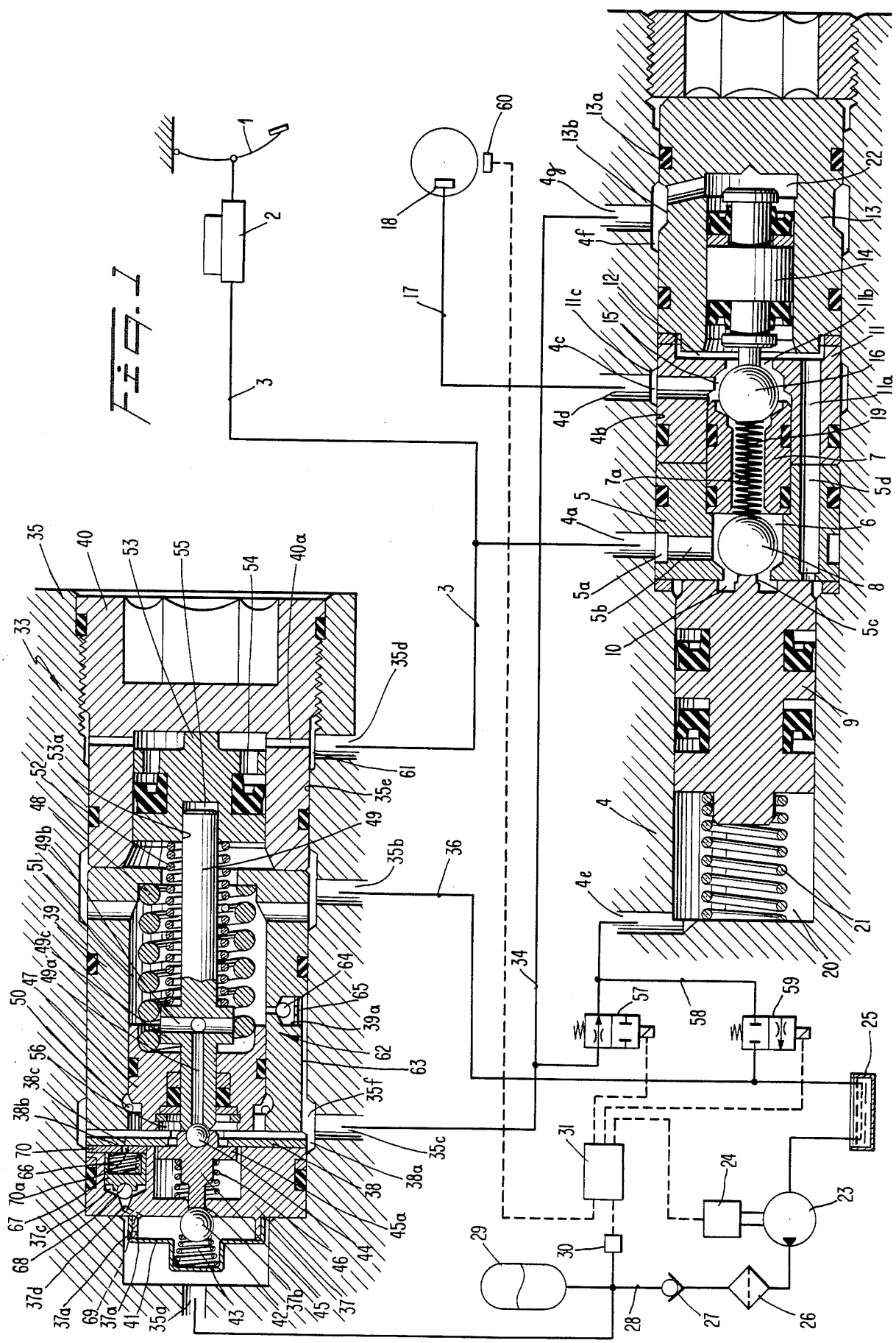
FIG. 1 is a partially schematic, partially sectioned view of an anti-skid system according to one embodiment of the present invention.

With reference now to FIG. 1, reference numeral 1 denotes a brake pedal. A master cylinder generally indicated as 2 is operatively connected to the brake pedal to provide fluid pressure in response to applied brake pressure. Reference numeral 3 denotes a fluid pressure line. A valve body 4 has a port 4a and a cylinder bore 4b. Fitted in a liquid-tight manner in the body 4 is a valve seat 5 having an annular slot 5a and a port 5b. A valve chamber 6 is defined by a valve seat 7 which is, in turn, fitted in the valve seat 5 in a liquid-tight relation. The fluid pressure generated upon depression of the brake pedal 1 is supplied through the line 3, the port 4a, the annular slot 5a and port 5b of the valve seat 5 to the chamber 6. In FIG. 1, the ball valve 8 is held in such a position to open a port 5c of the valve seat 5. Reference numeral 9 denotes a control or pressure reducing piston slidably fitted in a liquid-tight manner in a reduced diameter portion of the cylinder bore 4b of the valve body 4. A control chamber 10 is defined leftwardly of the valve seat 5. Also, a valve seat 11 is fitted in a liquid-tight manner in the cylinder bore 4b and has a chamber 11a therein. When the valve 8 is in the position as shown in FIG. 1, the fluid pressure in the chamber 6 is supplied by the control piston 9 to a chamber 12 through the control chamber 10, the valve chamber 5d and the chamber 11a of the valve seat 11. Reference numeral 13 denotes a closure member fitted in the cylinder bore 4b in a liquid-tight relation thereto. A piston 14 is slidably disposed within the closure member 13 in a liquid-tight manner. The chamber 12 is located to the right of the valve seat 10, and is defined between the valve seat 11 and the closure member 13. Defined in the valve seat 11 is a chamber 15 within which a valve 16 is disposed. When the valve 16 is in a position to close a channel 7a of the valve seat 7 and open a chamber 11b of the valve seat 11, the fluid pressure in the chamber 12 is supplied to a wheel cylinder 18 through the chamber 11a, the chamber 15, the bore 11c, the annular slot 4c and bore 4d of the valve body 4 and a line 17.

A spring 19 is disposed between the valves 8 and 16 to urge them in a direction away from each other. In FIG. 1, the control piston 9 is held in a non-operative position whereby the valve 8 is lifted off from the valve seat 5 against the action of the spring 19. The piston 14 is also held in non-operative position so as to lift the valve 16 off from the valve seat 11 against the action of the spring 19 to open the chamber 11b, and move the valve 16 into contact with the valve seat 7 to close the channel 7a. The valve seat 5 is in cooperative relation to the valve 8 so as to constitute a first valve, as will be understood from the following description.

A pump 23 is driven by an electric motor 24 to draw fluid from a reservoir 25 and pump the fluid out to a line 28 through a strainer 26 and a check valve 27. Connected to the line 28 are an accumulator 29 and a pressure responsive switch 30. Further, the accumulator 29 and electric motor 24 are connected to an electronic controller 31. The electronic controller 31 serves to control the electric motor 24 based upon a signal from the pressure responsive switch 30 to thereby maintain fluid pressure in the accumulator 29 within a predetermined range, for instance, 175 to 200 kg/cm$^3$, necessary to render the brake system operable. The fluid pressure is supplied from the accumulator 29 to a line 34 via the line 28 and a regulator valve 33. The line 34 serves to conduct the fluid pressure to a hydraulic chamber 20 defined leftwardly of the control piston 9.

A regulator valve 33 constitutes a third valve, which includes a body 35 having ports 35a, 35b, 35c and 35d. The port 35a of the body 35 is in communication with the line 28. The port 35b is in communication with the reservoir 25 via a drain line 36. The port 35c is in communication with the line 34 and the port 35d is in communication with the line 3. Fitted within a cylinder bore 35e of the valve body 35 are a valve seat 37, a washer 38, a piston guide 39 and a closure member 40 (from left to right in FIG. 1). The valve seat 37, piston guide 39 and closure member 40 are in a liquid-tight relation to the cylinder bore 35e. An annular projection 37a is provided on the left side of the valve seat 37. Fitted on the annular projection 37a is a porus retainer 41 which also acts as a filter. Disposed in the filter/retainer 41 are a valve 42 adapted to open and close the bore 37b of the valve seat 37, and a spring 43 adapted to urge the valve 42 toward the valve seat 37 to thereby close the bore 37b. The bore 37b of the valve seat 37 has a large diameter portion. Disposed in the large diameter portion are a movable member 45 with valve 44 positioned at the right end, as shown in FIG. 1, and a spring 46 adapted to urge the movable member 45 toward the washer 38. The outer diameter of the right end of the movable member 45 is smaller than the inner diameter of the washer 38. The movable member 45 is formed with a collar 45a having a diameter greater than the inner diameter of the washer 38 and serving to limit rightward movement of the movable member 45 upon contact with the washer 38.

A piston 47 is slidably disposed in the piston guide 39 in a liquid-tight fit. Also disposed therein are a spring 48 adapted to urge the piston 47 toward the washer 38, and a rod 49 having a left end slidably inserted in a liquid-tight manner into the piston 47. A ring 50 is provided at the left inner periphery of the piston guide 39 to prevent the piston 47 from coming out of the piston guide 39. The rod 49 has bores 49a and 49b. The bore 49a is opened and closed by the valve 44. The bore 49b is in communication with a drain chamber 51 which in turn, communicates the bore 49a with the bore 35b. The rod 49 is biased by a spring 52, so that the bore 49a is closed by the valve 44. A piston 53 is slidably disposed within the closure member 40 in a liquid-tight fit. The rod 49 also had a right end slidably fitted into a slot 53a of the piston 53. A chamber 54 is defined by the piston 53 in the closure member 40, and is in communication with the bore 35d through an opening 40a in the member 40 and an annular passage 61. With this arrangement, fluid pressure generated in the master cylinder 2 is supplied to the chamber 54. The piston 53 can slide toward the rod 49 against the action of the spring 52 to push the rod 49 leftwards without leaving a space 55 between the bottom of the slot 53a and the right end of the rod 49. The slot 53a is thus closed by the valve 44. The leftward movement of the rod 49 permits leftward movement of the valve 44 and the movable member 45 against the action of the spring 46.

Figure 2:
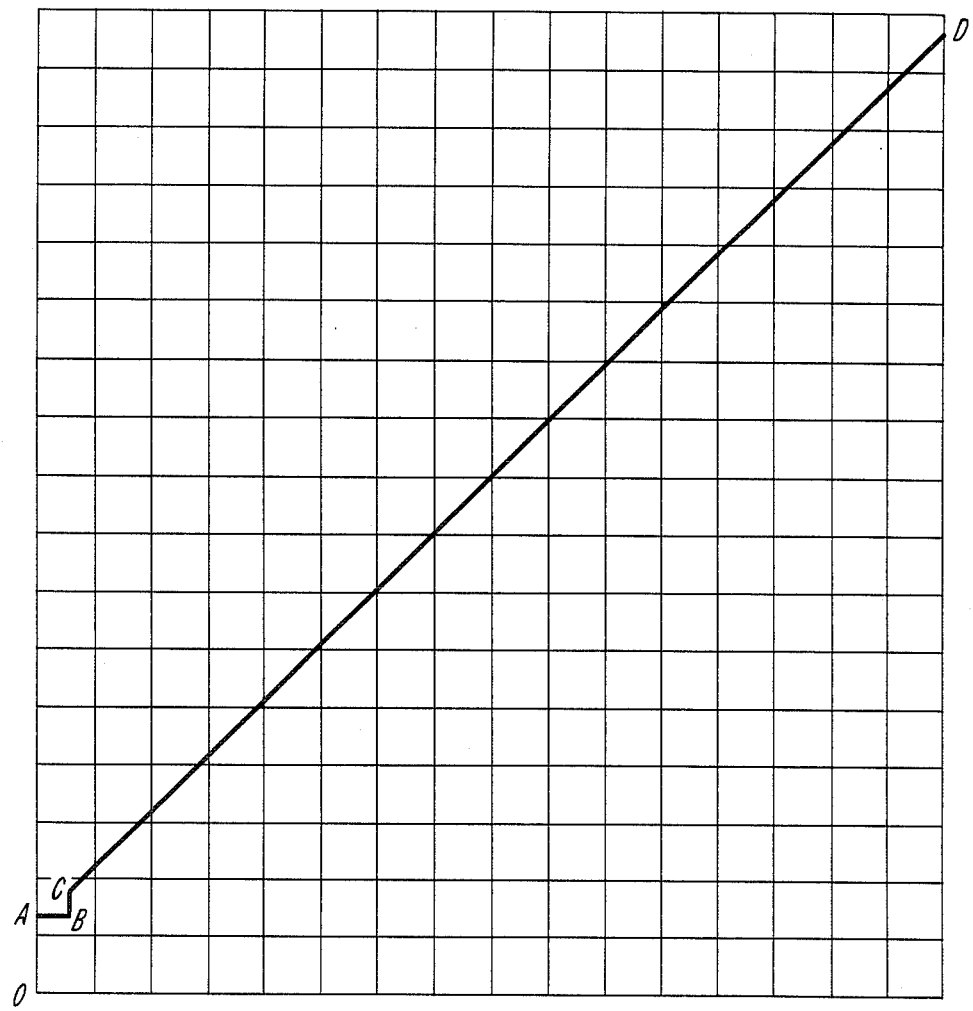
FIG. 2 is a graphic representation showing fluid pressure in a chamber in relation to fluid pressure generated by a master cylinder.

In this state, the valve 42 is lifted off the valve seat 37 against the action of the spring 43 and the fluid pressure from the accumulator 29 to open the bore 37d. Fluid pressure in then supplied into a chamber 56. This fluid pressure serves to push the rod 49 and the piston 47 to the right. In the event that the pushing force applied to rod 49 is greater than the action of the spring 52 and the piston 53, before pushing force applied to the piston 47 becomes greater than the action of the spring 48, and while fluid pressure in the chamber 54 is being increased from a low level, all of the movable member 45, valve 44, rod 49 and piston 53 move rightwards. In this state, firstly, the valve 44 is brought into contact with the valve seat 37 to stop the supply of fluid pressure from the accumulator 29. Then, the collar 45a of the movable member 45 impinges against the washer 38 and as a result, the valve 44 and movable member 45 are stopped. Movement of the rod 49 permits the valve 44 to open the bore 49a of the rod 49. Consequently, the fluid pressure in the chamber 56 is subject to decrease. In the event that the pushing force of the rod 49 again becomes less than the action of the spring 52, due to a decrease in the fluid pressure in the chamber 56, the bore 49a is closed by the valve 44 and the valve 42 is lifted off from the valve seat 37. Under these conditions, the fluid pressure in the chamber 56 is adjusted in direct proportion to that in the chamber 54, namely, fluid pressure to be generated by the master cylinder 2, with a first rate as predetermined in accordance with line B-C in FIG. 2. On the other hand, in the event that the fluid pressure supplied to the chamber 54 is high and during an increase in the fluid pressure in the chamber 56, the pushing force of the rod 49 in the rightward direction is less than that of piston 53 and the action of the spring 52, even if the pushing force of the piston 47 is greater than the action of the spring 48, the piston 47 slides rightwards to impinge on the collar 49c of the rod 49 and to thereby push the rod 49 rightwards. It is to be noted that the force that the fluid pressure in the chamber 56 that applies and pushes the rod 49 rightwards in a combination of the force applied to the rod 49 and that applied to the piston 47. It is for this reason that the piston 53, the rod 49, the valve 44, the movable member 45 and the valve 42 are moved rightwards and leftwards according to such combined force and the forces of the springs 43 and 46 in relation to the action of the piston 53 and the forces of the springs 48 and 52. Accordingly, the fluid pressure in the chamber 56 is adjusted in direct proportion to the fluid pressure generated by the master cylinder 2 with a second rate in accordance with the line C-D in FIG. 2.

The fluid pressure in the chamber 56 is supplied from a slot 38a of the washer 38 to the line 34 through an annular slot 35f and the bore 35c.

When no fluid pressure is supplied to the chamber 54, the piston 53 is held in such a position as shown in FIG. 1. Namely, the right end of the piston 53 is brought into contact with the inner periphery of the closure member 40 by the spring 52 so that the space 55 is available between the bottom of the slot 53a and the right end of the rod 49. In this state, when fluid pressure is greater than a predetermined level (15 to 16 kg/cm$^3$), the rod 49 slides rightwards against the action of the pressure to a predetermined level. Thereafter, the rod 49 slides leftwards so that the bore 49a is closed by the valve 44 to maintain the pressure in the chamber 56 at the predetermined level shown by line A-B in FIG. 2.

In order to prevent the fluid pressure from the accumulator 29 from exceeding said predetermined level, a relief valve 66 is incorporated in the valve seat 37 of the regulator valve 33. The relief valve 66 generally includes a bore 37c formed at the valve seat 37 adjacent the washer 38, a small passage 37d communicating the bottom of the bore 37c with a chamber defined between the filter/retainer 41 and the valve seat 37, a ball valve 68 is supported by a retainer 67 which in turn, is slidably disposed within the bore 37c, a spring 69 urging the retainer 67 and the valve 68 toward the bottom of the bore 37c, and a plate 70 having a passage 70a, fitted in an opening of the bore 37c. The passage 70a is in communication with a slot 38b of the washer 38 which in turn, is in communication with the passage 38c.

With the relief valve 66, the ball valve 68 is adapted to close the small passage 37d under the influence of the spring 69 against the fluid pressure when the fluid pressure is maintained at the above-mentioned predetermined level. On the other hand, when the fluid pressure exceeds the predetermined level, the ball valve 68 is displaced by the fluid pressure to open the small passage 37d. In this manner, the pressurized fluid flows from the accumulator to the chamber 56 to thereby stop an increase in the fluid pressure.

The fluid pressure supplied from the regulator valve 33 to the line 37 is then supplied from the port 4e of the valve body 4 to the hydraulic chamber 20 defined leftwardly of the control piston 9 via a solenoid valve 57 normally held in an open position. A line 58 is adapted to connect the line 34 with the line 36. Provided in the line 58 is a solenoid valve 59 normally held in a closed position. The solenoid valves 57 and 59 cooperates to define a second valve. The solenoid valves 57 and 59 are respectively connected to the electronic control device 31. Normally, the electronic control device 31 serves to supply fluid pressure from the regulator valve 33 to the hydraulic chamber 20 while effecting no operation of the solenoid valves 57 and 59. However, when a vehicle wheel is likely to lock up based on a signal from a sensor 60 under braked conditions, the solenoid valves 57 and 59 are rendered operable whereby the fluid pressure is delivered from the hydraulic chamber 20 to the reservoir 25 to exclude the fluid pressure from the control piston 9. Under these circumstances, the control piston 9 is moved leftwards under the influence of the fluid pressure in the control chamber 10. At the beginning of such movement, the valve 8 is brought into contact with the valve seat 5 to close the port 5c. Subsequent movement of the control piston 9 permits an increase in the volume of the control chamber 10 (part of the hydraulic line directed to the wheel cylinder) while lowering the fluid pressure in the wheel cylinder 18 to decrease the applied brake force to the vehicle wheel. Due to this action, the speed of rotation of the wheel increases and no wheel lock up occurs. The solenoid valves are thereafter returned to their original position by the electronic control device 31 to transmit the fluid pressure from the regulator valve 33 to the hydraulic chamber 20. In this state, the control piston 9 is returned to decrease the volume of the hydraulic chamber 20 while increasing the fluid pressure in the wheel cylinder 18, resulting in an increase in the applied brake force to the wheel. The solenoid valves remain inoperable unless the wheel is likely to lock up irrespective of an increase in the applied brake force to the wheel. It is for these reasons that the control piston 9 is returned to its non-operative position and the valve 8 is again lifted off the valve seat 5. It is to be noted that during return of the control piston 9, the solenoid valve 57 could temporarily be rendered operable due to an increase in the speed of rotation of the wheel so as to stop an increase in the fluid pressure in the hydraulic chamber 10, provided that the electronic control device 31 is so constructed. It is necessary that the control piston 9 be returned to its non-operative position if transmission of the pressurized fluid in the accumulator 29 into the line 34 is stopped due to the regulator valve 33 when the brake pedal 1 is released. To this end, a spring 21 is positioned in the hydraulic chamber 20 to urge the control piston 9 to its non-operative position and check valve 62 is disposed in the regulator valve 33. The check valve 62 includes a stepped bore 39a extending from the outer periphery of the piston guide 39 to the drain chamber 51. The outer periphery of the piston guide 39 is partially cut away to form a passage 63 adapted to communicate the bore 39a with annular slot 35f. The check valve 62 also includes a ball valve element 64 inserted into the bore 39a and an apertured closure member 65 fitted within an opening of the bore 39a adjacent the passage 63. When the line 34 is supplied with the fluid pressure by the regulator valve 33, the check valve 62 is in contact with the stepped portion of the hole 39a under the influence of the fluid pressure in the line 34 so as to close the bore 39a. On the other hand, when transmission of the fluid pressure from the accumulator 29 to the line 34 is stopped due to the regulator valve 33, the control piston 9 is forcibly returned by the spring 21 and as a result, pressure in the hydraulic chamber 20 and the line 34 becomes less than atmospheric. Under these circumstances, the check valve 62 permits the pressurized fluid in the drain chamber 51 to flow from the bore 39a to the line 34 and hydraulic chamber 20. Accordingly, when the brake pedal 1 is released, the transmission of the fluid pressure from the accumulator 29 to the line 34 is stopped due to the regulator valve 33, and the control piston 9 is returned to its non-operative position under the influence of the spring 21.

The fluid pressure supplied from the regulator valve 33 to the line 34 is then transmitted to the chamber 22 through the port 4g of the body 4, the annular slot 4f and the bore 13a of the closure member 13. In case that no fluid pressure is obtained, for instance, due to a failure in the pump 23 or the accumulator 29, the control piston 9 is returned under the influence of the fluid pressure in the control chamber 10 under braked conditions and the valve 8 comes into contact with the valve seat 5 to close the port 5c. This is due to the fact that no fluid pressure is supplied to the hydraulic chamber 20 located leftwardly of the control piston 9. However, no fluid pressure is supplied to the chamber 22 located rightwardly of the piston 14. The valve 16 is lifted off from the valve seat 7 by the spring 19 to open the channel 7a and is also brought into contact with the valve seat 11 to close the chamber 11b. Thus, the fluid pressure supplied to the valve chamber 6 from the master cylinder 2 is transmitted through the channel 7a of the valve seat 7 to the valve chamber 15 and further to the wheel cylinder 18, thereby effecting a braking. At this time, the control chamber 10 and the chamber 12 are no longer in communication with the valve chambers 6 and 15 so that no pressurized fluid from the master cylinder 2 is wasted in the chambers 10 and 12.

It is to be understood that the invention is not limited to the foregoing embodiment, and that various changes and modifications may be made without departing from the scope of the following claims.

What is claimed is:

1. An actuator for use in an anti-skid system for wheels of a wheeled vehicle, comprising:

a first valve positioned in a pressure line to selectively divide said pressure line into two separate lines, one directed to a master cylinder and the other directed to a wheel cylinder, said pressure line connecting said master cylinder with said wheel cylinder;

an electric motor;

a pump driven by said electric motor;

an accumulator means for accumulating fluid pressure generated by said pump;

a control piston in said first valve and being movable from a non-operative position under fluid pressure in said pressure line directed to said wheel cylinder and returnable to the non-operative position to open and close said first valve whereby the volume of said pressure line directed to said wheel cylinder is increased when the first valve is open and decreased when the first valve is closed;

a second valve operable to supply said fluid pressure to said control piston upon normal rolling of the wheels so as to move said control piston to the non-operative position against said fluid pressure in said pressure line directed to said wheel cylinder and operable to exclude said fluid pressure from said control piston when the wheels are predisposed to lock up so that said control piston is moved from said non-operative position under the fluid pressure in said pressure line directed to said wheel cylinder;

a third valve having first valving means for controllably communicating a hydraulic chamber with said accumulator and stopping such communication, said hydraulic chamber supplying the fluid pressure to said control piston, and second valving means for controllably communicating said hydraulic chamber with a drain line and stopping such communication;

said third valve controlling said fluid pressure to be supplied to said hydraulic chamber in response to depression and release of a brake pedal; and a relief valve provided in a seat member of said first valving means of said third valve so that when said fluid pressure from said accumulator exceeds a predetermined upper limit, the relief valve is opened to introduce hydraulic fluid to said drain line through said second valving means.

2. An actuator as set forth in claim 1, wherein said first valve comprises a valve element positioned in a control chamber and a valve seat, the fluid pressure generated in response to the depression of the brake pedal permitting movement of the control piston to lower the fluid pressure in the wheel cylinder.

3. An actuator as set forth in claim 1, wherein said first valve comprises a closure member slidably received in a cylinder bore of the first valve, a piston slidably disposed within the closure member, an annular chamber defined between a valve seat and the closure member and a ball valve element disposed in a ball valve chamber, the ball valve element movable between a position to open and close a valve seat chamber defined in the valve seat and supply the pressure fluid to the wheel cylinder when in the open position.

4. An actuator as set forth in claim 1, wherein the second valve comprises a first solenoid valve and a second solenoid valve.

* * * * *